US012537300B2

(12) United States Patent
Tsai

(10) Patent No.: US 12,537,300 B2
(45) Date of Patent: Jan. 27, 2026

(54) ANTENNA STRUCTURE

(71) Applicant: Wistron NeWeb Corp., Hsinchu (TW)

(72) Inventor: Tsung-Jung Tsai, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 378 days.

(21) Appl. No.: 18/313,443

(22) Filed: May 8, 2023

(65) Prior Publication Data

US 2023/0402751 A1 Dec. 14, 2023

(30) Foreign Application Priority Data

Jun. 9, 2022 (TW) ................................. 111121363

(51) Int. Cl.

*H01Q 5/307* (2015.01)
*H01Q 1/22* (2006.01)
*H01Q 1/48* (2006.01)
*H01Q 9/04* (2006.01)
*H01Q 13/10* (2006.01)

(52) U.S. Cl.

CPC ........... *H01Q 5/307* (2015.01); *H01Q 1/2266* (2013.01); *H01Q 1/48* (2013.01); *H01Q 9/0421* (2013.01); *H01Q 13/106* (2013.01)

(58) Field of Classification Search

CPC .... H01Q 13/18; H01Q 9/0421; H01Q 13/106; H01Q 1/48; H01Q 1/226; H01Q 5/307

See application file for complete search history.

(56) References Cited

U.S. PATENT DOCUMENTS

| | | | | |
|---|---|---|---|---|
| 4,130,823 A * | 12/1978 | Hoople | .................. | H01Q 5/357 343/768 |
| 10,283,847 B2 * | 5/2019 | Li | ........................ | H01Q 1/2291 |
| 10,490,902 B2 * | 11/2019 | Yen | ........................ | H01Q 13/10 |
| 11,563,275 B2 * | 1/2023 | Wei | ........................ | H01Q 5/328 |
| 2017/0005414 A1 | 1/2017 | Yang | | |
| 2017/0207542 A1 * | 7/2017 | Tseng | ........................ | H01Q 1/48 |
| 2018/0038051 A1 * | 2/2018 | Vargas | .................... | E01B 27/20 |

(Continued)

FOREIGN PATENT DOCUMENTS

| | | |
|---|---|---|
| CN | 112751175 A | 5/2021 |
| TW | 201703350 A | 1/2017 |

*Primary Examiner* — Dameon E Levi
*Assistant Examiner* — David Andrew Kubera
(74) *Attorney, Agent, or Firm* — McClure, Qualey & Rodack, LLP

(57) ABSTRACT

An antenna structure includes a ground element, a first radiation element, a second radiation element, a nonconductive support element, and a metal cavity. The first radiation element has a feeding point. The first radiation element is coupled to the ground element. The second radiation element is coupled to the feeding point. The second radiation element and the first radiation element substantially extend in opposite directions. The ground element, the first radiation element, and the second radiation element are disposed on the nonconductive support element. The metal cavity includes a coupling metal plate with a slot. The ground element, the first radiation element, the second radiation element, and the nonconductive support element are disposed inside the metal cavity. The first radiation element and the second radiation element are adjacent to the coupling metal plate. The feeding point is covered by the coupling metal plate.

19 Claims, 10 Drawing Sheets

(56) References Cited

U.S. PATENT DOCUMENTS

| | | | | |
|---|---|---|---|---|
| 2018/0048051 | A1* | 2/2018 | Chang .................... | H01Q 5/371 |
| 2019/0260132 | A1* | 8/2019 | Chayat ................. | H01Q 9/0414 |
| 2021/0234250 | A1* | 7/2021 | Migliorino ............... | H01Q 9/42 |
| 2021/0367321 | A1* | 11/2021 | Hung ..................... | H01Q 5/385 |

* cited by examiner

ANTENNA STRUCTURE

CROSS REFERENCE TO RELATED APPLICATIONS

This application claims priority of Taiwan Patent Application No. 111121363 filed on Jun. 9, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient bandwidth, it will degrade the communication quality of the relative mobile device. Accordingly, it has become a critical challenge for antenna designers to design a small-size, wideband antenna element.

BRIEF SUMMARY OF THE INVENTION

In an exemplary embodiment, the invention is directed to an antenna structure that includes a ground element, a first radiation element, a second radiation element, a nonconductive support element, and a metal cavity. The first radiation element has a feeding point. The first radiation element is coupled to the ground element. The second radiation element is coupled to the feeding point. The second radiation element and the first radiation element substantially extend in opposite directions. The ground element, the first radiation element, and the second radiation element are disposed on the nonconductive support element. The metal cavity is coupled to the ground element, and includes a coupling metal plate with a slot. The ground element, the first radiation element, the second radiation element, and the nonconductive support element are disposed inside the metal cavity. The first radiation element and the second radiation element are adjacent to the coupling metal plate. The feeding point is covered by the coupling metal plate.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
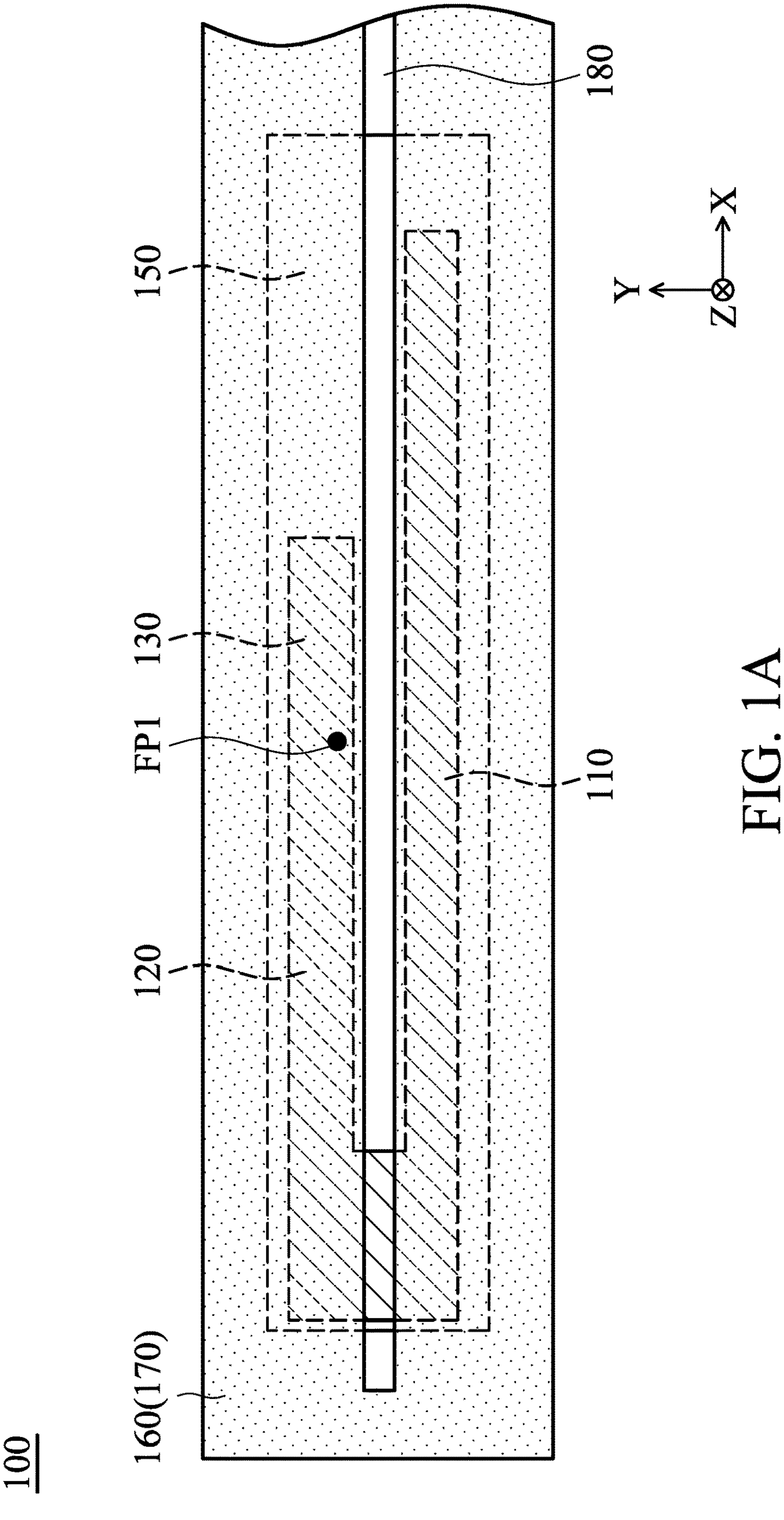
FIG. 1A is a front view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
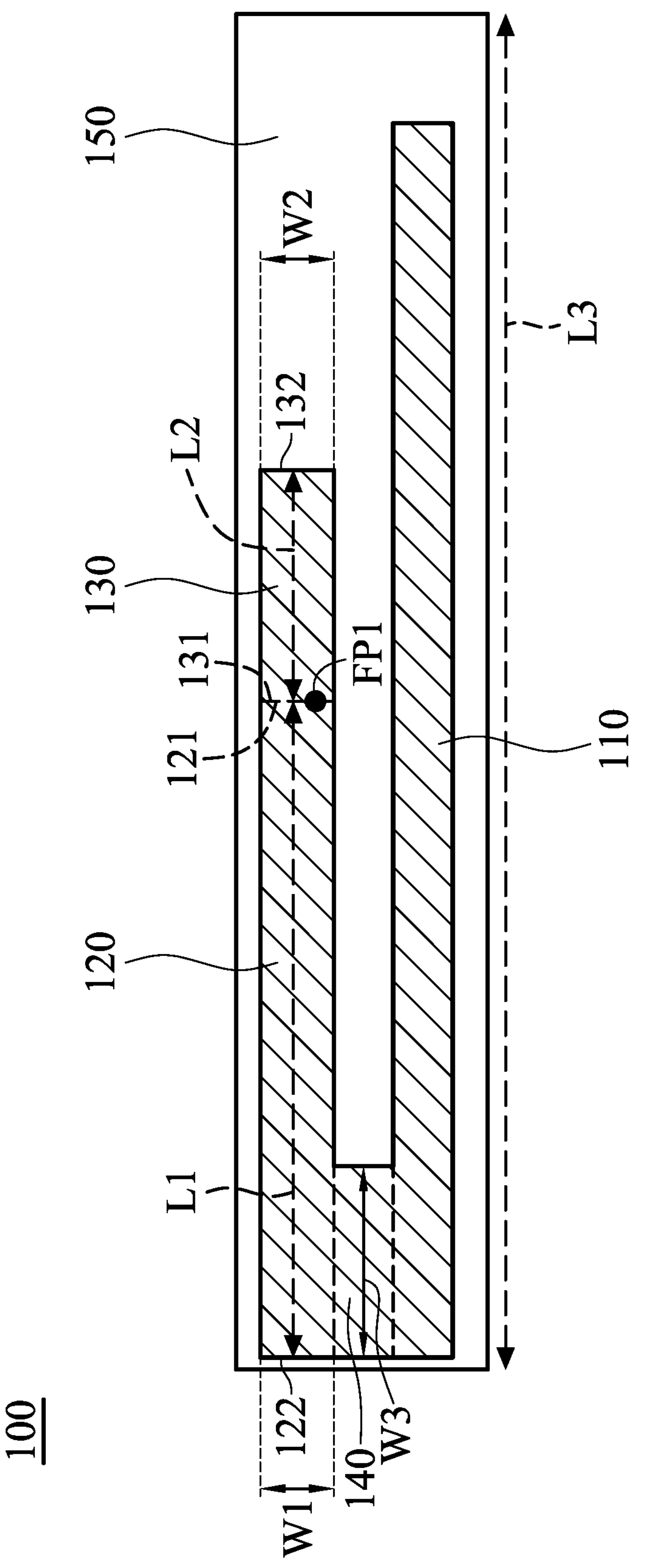
FIG. 1B is a partial view of an antenna structure according to an embodiment of the invention.
Figure 1C:
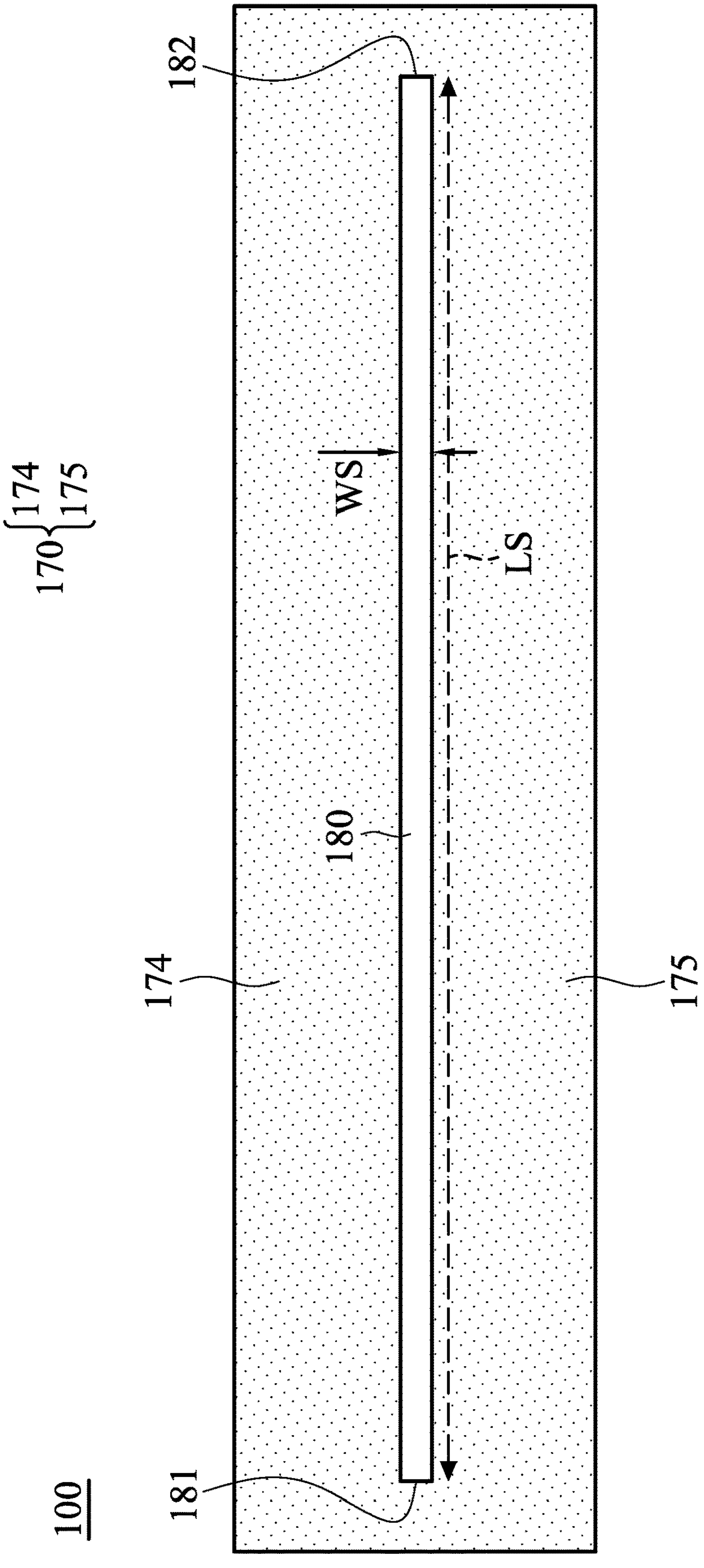
FIG. 1C is another partial view of an antenna structure according to an embodiment of the invention.
Figure 1D:
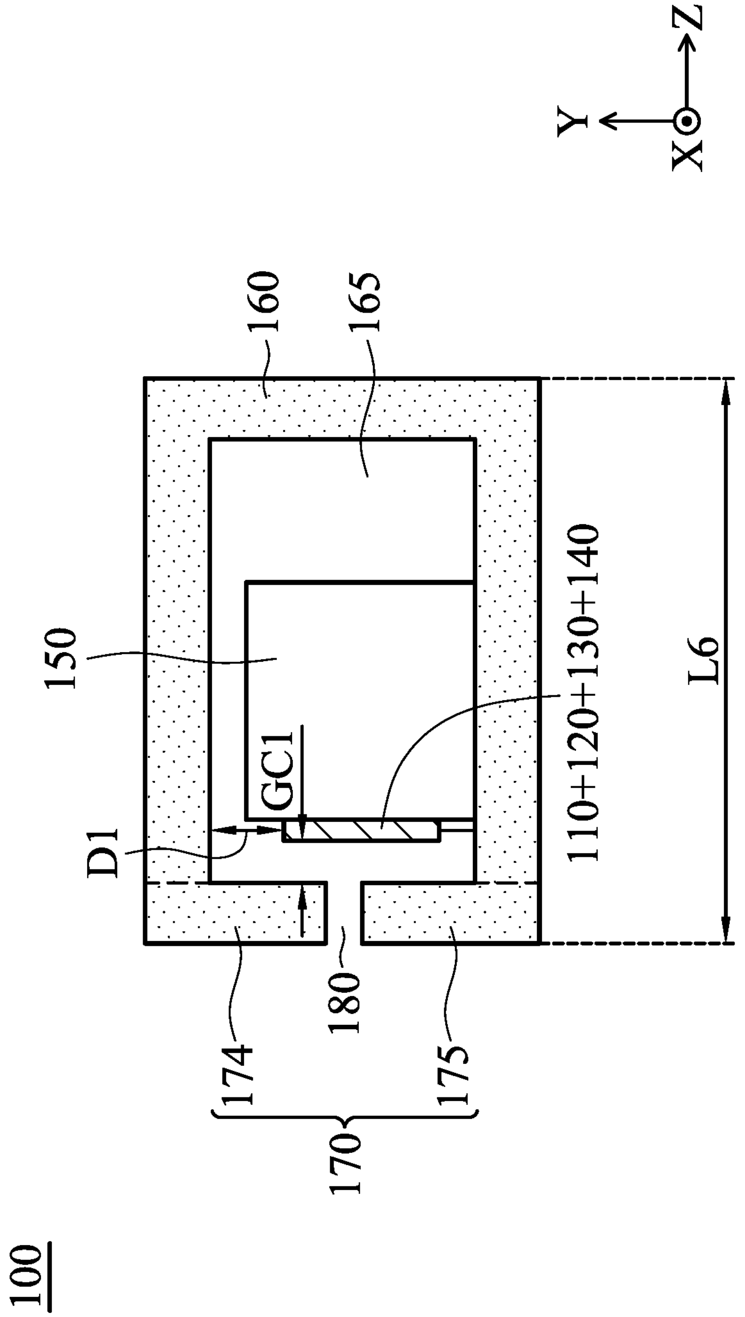
FIG. 1D is a sectional view of an antenna structure according to an embodiment of the invention.

FIG. 1A is a front view of an antenna structure 100 according to an embodiment of the invention. FIG. 1B is a partial view of the antenna structure 100 according to an embodiment of the invention. FIG. 1C is another partial view of the antenna structure 100 according to an embodiment of the invention. FIG. 1D is a sectional view of the antenna structure 100 according to an embodiment of the invention. Please refer to FIG. 1A, FIG. 1B, FIG. 1C, and FIG. 1D together. The antenna structure 100 may be applied to a mobile device, such as a tablet computer or a notebook computer. As shown in FIG. 1A, FIG. 1B, FIG. 1C, and FIG. 1D, the antenna structure 100 at least includes a ground element 110, a first radiation element 120, a second radiation element 130, a nonconductive support element 150, and a metal cavity 160. The ground element 110, the first radiation element 120, and the second radiation element 130 may all be made of metal materials, such as copper, silver, aluminum, iron, or their alloys.

The ground element 110 provides a ground voltage. The ground element 110 is coupled to the metal cavity 160. In some embodiments, the ground element 110 is coupled through a ground copper foil, a pogo pin, or a metal spring (not shown) to the metal cavity 160, but it is not limited thereto. The metal cavity 160 is considered as a system ground of the antenna structure 100.

The first radiation element 120 may substantially have a relatively long straight-line shape. Specifically, the first radiation element 120 has a first end 121 and a second end 122. A feeding point FP1 is positioned at the first end 121 of the first radiation element 120. The second end 122 of the first radiation element 120 is coupled to the ground element 110. The feeding point FP1 may be further coupled to a signal source (not shown). For example, the aforementioned signal source may be an RF (Radio Frequency) module for exciting the antenna structure 100. In some embodiments, the antenna structure 100 further includes a shorting element 140 made of a metal material, such that the second end 122 of the first radiation element 120 is coupled through the shorting element 140 to the ground element 110. For example, the shorting element 140 may substantially have a rectangular shape or a square shape. The width W3 of the shorting element 140 may be greater than the width W1 of the first radiation element 120. Also, the width W3 of the shorting element 140 may be greater than the width W2 of the second radiation element 130.

The second radiation element 130 may substantially have a relatively short straight-line shape. Specifically, the second radiation element 130 has a first end 131 and a second end 132. The first end 131 of the second radiation element 130 is coupled to the feeding point FP1. The second end 132 of the second radiation element 130 is an open end. For example, the second end 132 of the second radiation element 130 and the second end 122 of the first radiation element 120 may substantially extend in opposite directions and away from each other. In some embodiments, the combination of the first radiation element 120, the second radiation element 130, the shorting element 140, and the ground element 110 substantially has an inverted U-shape.

The nonconductive support element 150 may be made of a plastic material, and its shape is not limited in the invention. The ground element 110, the first radiation element 120, the second radiation element 130, and the shorting element 140 are all disposed on the nonconductive support element 150. For example, the ground element 110, the first radiation element 120, the second radiation element 130, and the shorting element 140 may be formed on the same surface of the nonconductive support element 150 by using the LDS (Laser Direct Structuring) technology, but they are not limited thereto. In alternative embodiments, the ground element 110 extends beyond the nonconductive support element 150.

The metal cavity 160 may substantially have a hollow cuboid shape with a hollow portion 165. Specifically, the metal cavity 160 includes a coupling metal plate 170 with a slot 180. The ground element 110, the first radiation element 120, the second radiation element 130, the shorting element 140, and the nonconductive support element 150 are all disposed inside the metal cavity 160. The first radiation element 120 and the second radiation element 130 are adjacent to the coupling metal plate 170. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The slot 180 may be a closed slot with a straight-line shape, and it may have a first closed end 181 and a second closed end 182. In some embodiments, the coupling metal plate 170 includes a first portion 174 and a second portion 175. The slot 180 is positioned between the first portion 174 and the second portion 175 of the coupling metal plate 170. For example, the first radiation element 120, the second radiation element 130, and the feeding point FP1 may all be covered by the first portion 174 of the coupling metal plate 170. That is, the vertical projections of the first radiation element 120, the second radiation element 130, and the feeding point FP1 may all be inside the first portion 174 of the coupling metal plate 170. In some embodiments, a coupling gap GC1 is formed between the first radiation element 120 or the second radiation element 130 and the first portion 174 of the coupling metal plate 170. The ground element 110 is covered by the second portion 175 of the coupling metal plate 170. That is, the vertical projection of the ground element 110 may be inside the second portion 175 of the coupling metal plate 170. With such a design, the metal cavity 160 and its coupling metal plate 170 can be considered as an extension radiation element of the antenna structure 100.

Figure 2:
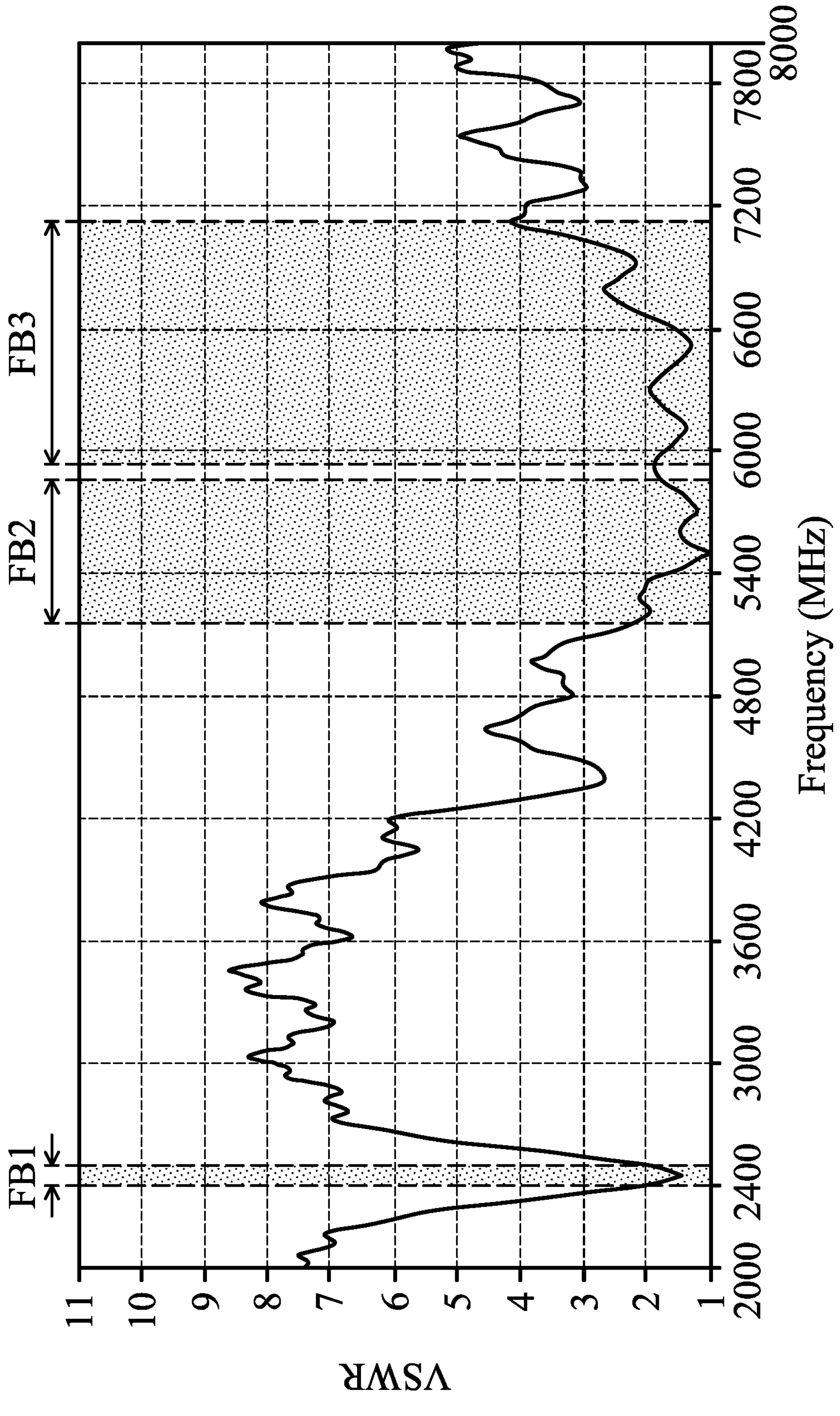
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can operate in a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the antenna structure 100 can support at least the wideband operations of conventional WLAN (Wireless Local Area Network) and next-generation Wi-Fi 6E.

In some embodiments, the operational principles of the antenna structure 100 will be described as follows. The first radiation element 120 and the slot 180 of the coupling metal plate 170 are excited to generate the first frequency band FB1. The second radiation element 130 is excited to generate the second frequency band FB2. The metal cavity 160 is excited by the first radiation element 120 and the second radiation element 130 using a coupling mechanism, so as to generate the frequency band FB3. In addition, the slot 180 of the coupling metal plate 170 is configured to fine-tune the impedance matching of the first frequency band FB1, the second frequency band FB2, and the third frequency band FB3. According to practical measurements, if the metal cavity 160 is used and the feeding point FP1 is covered by the coupling metal plate 170, the radiation gain and the radiation efficiency of the antenna structure 100 can be significantly improved.

In some embodiments, the element sizes of the antenna structure 100 will be described as follows. The length L1 of the first radiation element 120 may be from 0.25 to 0.5 wavelength (λ/4~ λ/2) of the first frequency band FB1 of the antenna structure 100. The width W1 of the first radiation element 120 may be from 1 mm to 3 mm. The length L2 of the second radiation element 130 may be from 0.5 to 1 wavelength (λ/2~ 1λ) of the second frequency band FB2 of the antenna structure 100. The width W2 of the second radiation element 130 may be from 1 mm to 3 mm. The width W3 of the shorting element 140 may be from 3 mm to 7 mm. The width of the coupling gap GC1 may be from 1 mm to 3 mm. The length LS of the slot 180 may be from 1 to 3 times the length L3 of the nonconductive support element 150. The width WS of the slot 180 may be from 1 mm to 3 mm. Along the direction of Y-axis, the distance D1 between the first radiation element 120 or the second radiation element 130 and the metal cavity 160 may be from 1 mm to 3 mm. Along the direction of Z-axis, the length L6 of the metal cavity 160 may be longer than or equal to 10 mm. The above ranges of element sizes are calculated and obtained according to many experiment results, and they help to optimize the operational bandwidth and impedance matching of the antenna structure 100.

Figure 3:
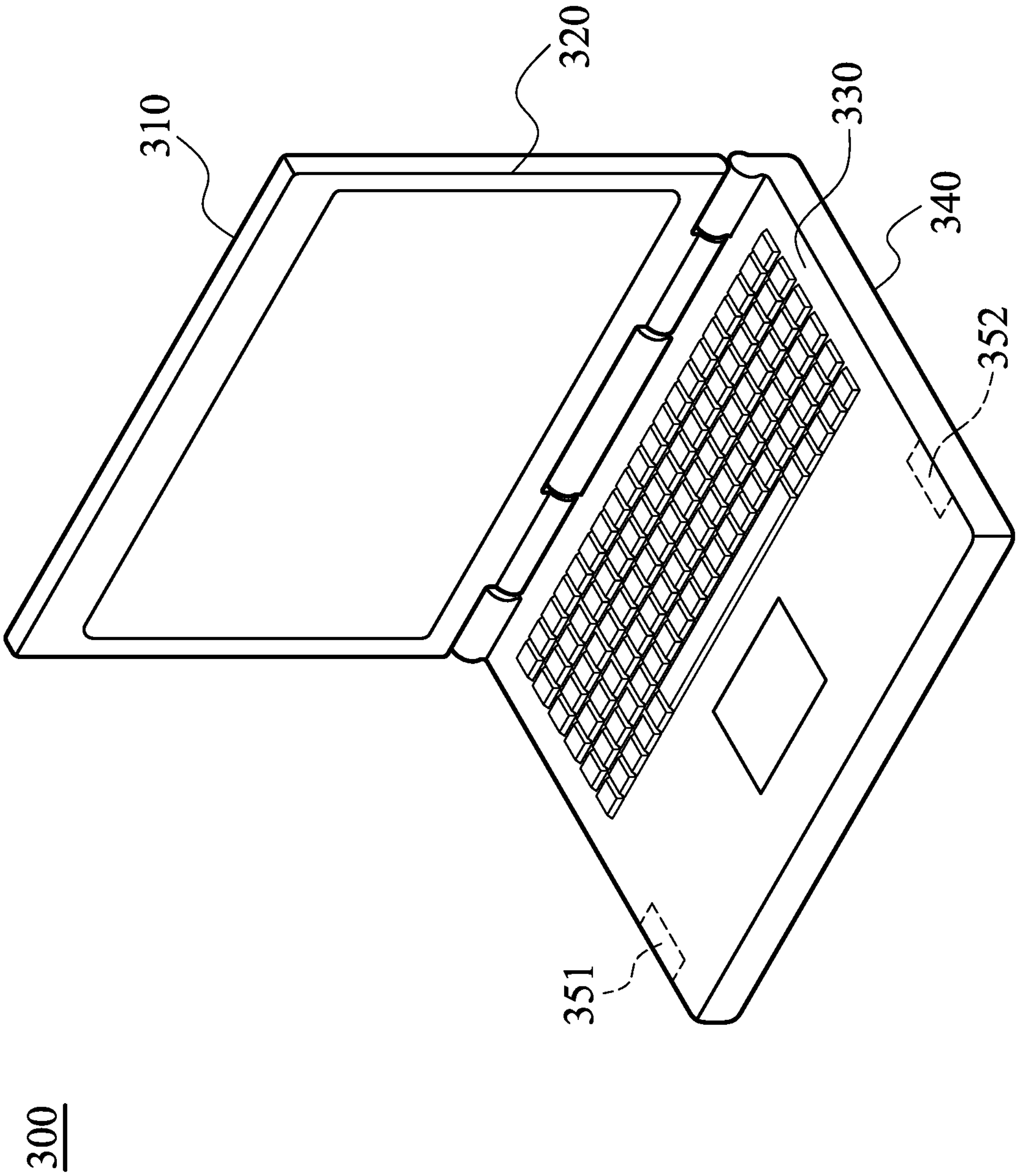
FIG. 3 is a perspective view of a notebook computer according to an embodiment of the invention.

FIG. 3 is a perspective view of a notebook computer 300 according to an embodiment of the invention. In the embodiment of FIG. 3, the aforementioned antenna structure 100 is applied to the notebook computer 300, and the notebook computer 300 includes an upper cover housing 310, a display frame 320, a keyboard frame 330, and a base housing 340. It should be understood that the upper cover housing 310, the display frame 320, the keyboard frame 330, and the base housing 340 are equivalent to the so-called "A-component", "B-component", "C-component" and "D-component" in the field of notebook computers. The aforementioned antenna structure 100 may be disposed at a first position 351 and/or a second position 352 of the notebook computer 300, so as to provide the function of side radiation. The antenna structure 100 may be applied to a variety of mobile devices with narrow borders and configured to maintain the good communication quality. In some embodiments, an antenna window (not shown) relative to the antenna structure 100 is opened on the base housing 340, such that the antenna structure 100 can provide the function of bottom radiation. In alternative embodiments, the notebook computer 300 uses a plurality of antenna structures 100 for supporting the wideband operations of MIMO (Multi-Input and Multi-Output).

The following embodiments will introduce different configurations and other structural features of the antenna structure 100. It should be understood that these figures and descriptions are merely exemplary, rather than limitations of the invention.

Figure 4A:
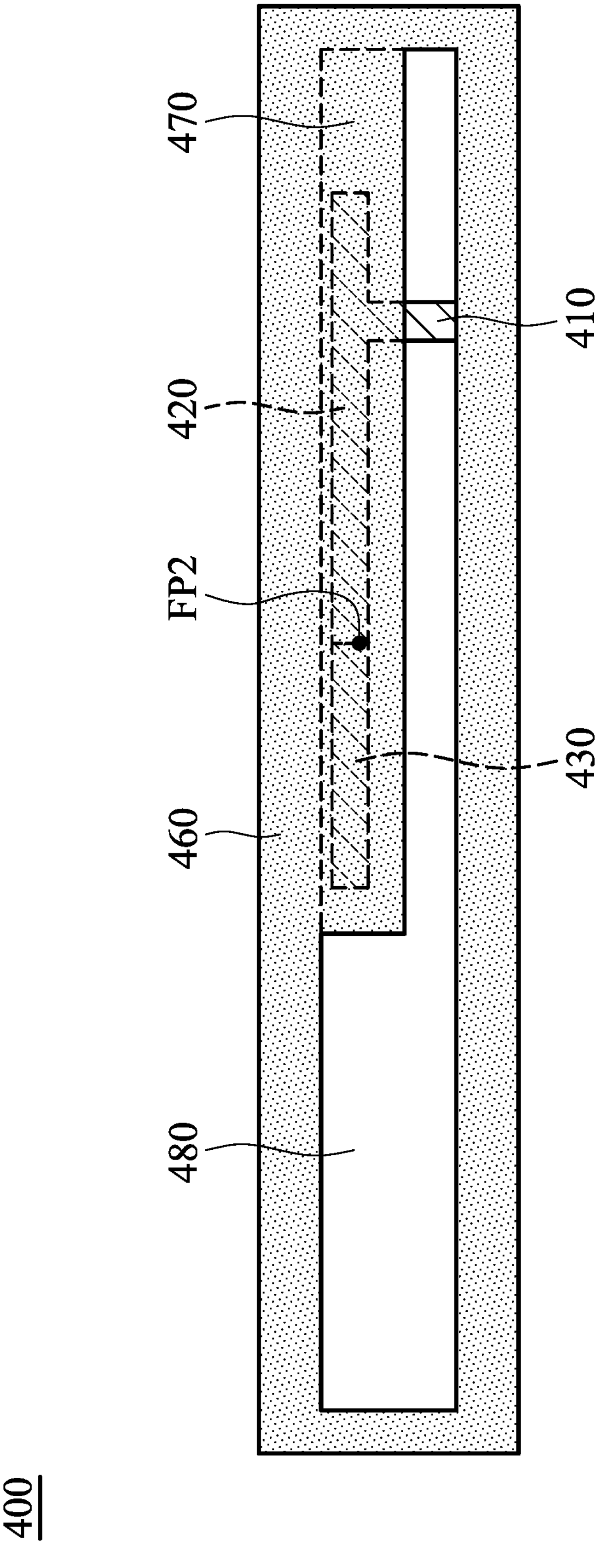
FIG. 4A is a front view of an antenna structure according to an embodiment of the invention.
Figure 4B:
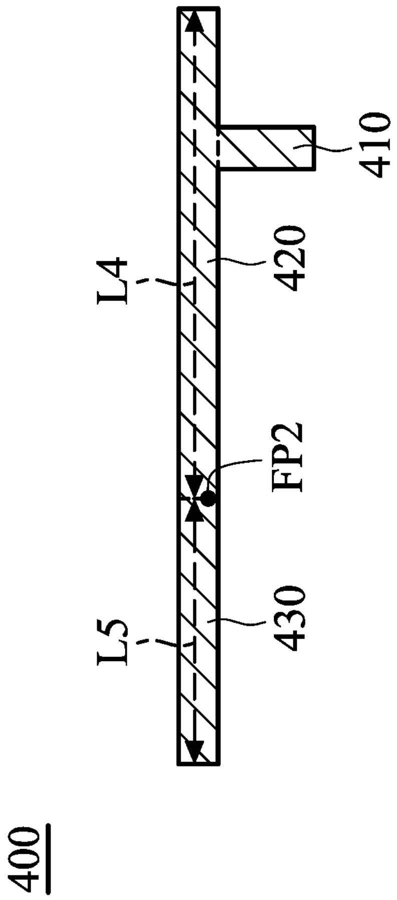
FIG. 4B is a partial view of an antenna structure according to an embodiment of the invention.
Figure 4C:
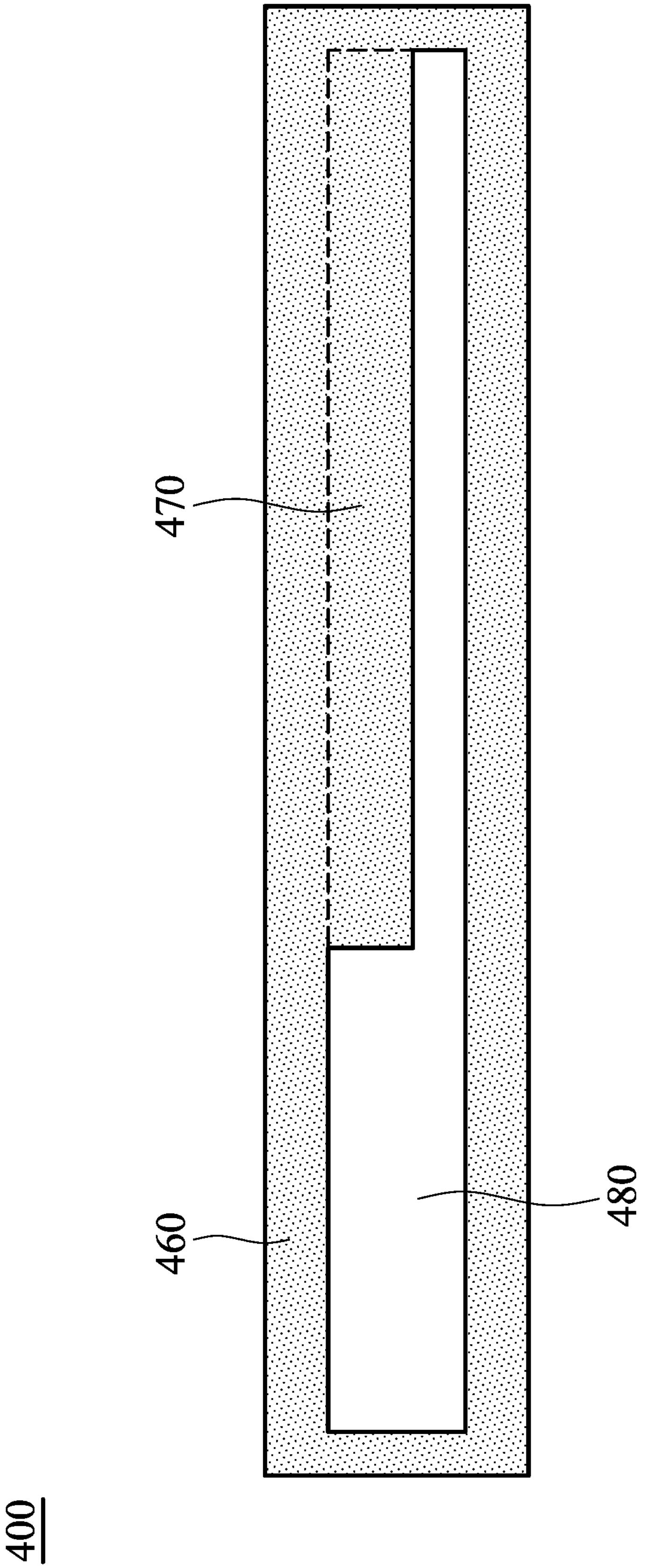
FIG. 4C is another partial view of an antenna structure according to an embodiment of the invention.
Figure 4D:
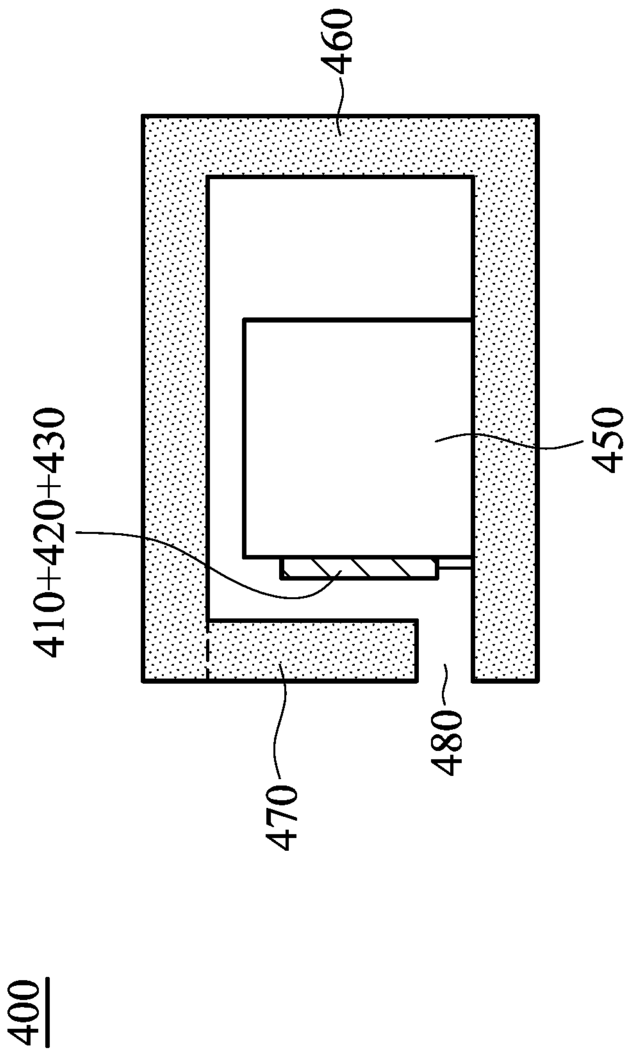
FIG. 4D is a sectional view of an antenna structure according to an embodiment of the invention.

FIG. 4A is a front view of an antenna structure 400 according to an embodiment of the invention. FIG. 4B is a partial view of the antenna structure 400 according to an embodiment of the invention. FIG. 4C is another partial view of the antenna structure 400 according to an embodiment of the invention. FIG. 4D is a sectional view of the antenna structure 400 according to an embodiment of the invention. Please refer to FIG. 4A, FIG. 4B, FIG. 4C, and FIG. 4D together.

FIG. 4A, FIG. 4B, FIG. 4C and FIG. 4D are similar to FIG. 1A, FIG. 1B, FIG. 1C and FIG. 1D. In the embodiment of FIG. 4A, FIG. 4B, FIG. 4C and FIG. 4D, the antenna structure 400 includes a ground element 410, a first radiation element 420, a second radiation element 430, a nonconductive support element 450, and a metal cavity 460. The metal cavity 460 includes a coupling metal plate 470 with a slot 480. To simplify the figure, the nonconductive support element 450 is not displayed in FIG. 4A, FIG. 4B and FIG. 4C. The first radiation element 420 and the second radiation element 430 are coupled to a feeding point FP2. The first radiation element 420 is further coupled to the ground element 410. The combination of the first radiation element 420, the second radiation element 430, and the ground element 410 may substantially have a T-shape. The coupling metal plate 470 may substantially have a rectangular shape, and its slot 480 may be a closed slot with an L-shape. The first radiation element 420, the second radiation element 430, and the feeding point FP2 may all be covered by the coupling metal plate 470. That is, the vertical projections of the first radiation element 420, the second radiation element 430, and the feeding point FP2 are inside the coupling metal plate 470.

According to practical measurements, the antenna structure 400 can also operate in the first frequency band FB1, the second frequency band FB2, and the third frequency band FB3 as mentioned above. The length L4 of the first radiation element 420 may be from to 0.5 wavelength (λ/4~λ/2) of the first frequency band FB1 of the antenna structure 400. The length L5 of the second radiation element 430 may be from 0.25 to 0.5 wavelength (λ/4~λ/2) of the second frequency band FB2 of the antenna structure 400. Other features of the antenna structure 400 of FIG. 4A, FIG. 4B, FIG. 4C, and FIG. 4D are similar to those of the antenna structure 100 of FIG. 1A, FIG. 1B, FIG. 1C, and FIG. 1D. Accordingly, the two embodiments can achieve similar levels of performance.

The invention proposes a novel antenna structure. In comparison to the conventional design, the invention has at least the advantages of small size, wide bandwidth, high radiation efficiency, low manufacturing cost, and good communication quality. Therefore, the invention is suitable for application in a variety of mobile communication devices.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-4. The invention may merely include any one or more features of any one or more embodiments of FIGS. 1-4. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a ground element;

a first radiation element, having a feeding point, wherein the first radiation element is coupled to the ground element;

a second radiation element, coupled to the feeding point, wherein the second radiation element and the first radiation element substantially extend in opposite directions;

a nonconductive support element, wherein the ground element, the first radiation element, and the second radiation element are disposed on the nonconductive support element; and a metal cavity, coupled to the ground element, and comprising a coupling metal plate with a slot, wherein the ground element, the first radiation element, the second radiation element, and the nonconductive support element are disposed inside the metal cavity;

wherein the first radiation element and the second radiation element are adjacent to the coupling metal plate, and the feeding point is covered by the coupling metal plate;

wherein the antenna structure operates in a first frequency band, a second frequency band, and a third frequency band;

wherein the first radiation element and the slot of the coupling metal plate are excited to generate the first frequency band.

2. The antenna structure as claimed in claim 1, further comprising:

a shorting element, wherein the first radiation element is coupled through the shorting element to the ground element.

3. The antenna structure as claimed in claim 2, wherein a combination of the first radiation element, the second radiation element, the shorting element, and the ground element substantially has an inverted U-shape.

4. The antenna structure as claimed in claim 1, wherein the first radiation element substantially has a long straight-line shape.

5. The antenna structure as claimed in claim 1, wherein the second radiation element substantially has a short straight-line shape.

6. The antenna structure as claimed in claim 1, wherein the metal cavity substantially has a hollow cuboid shape.

7. The antenna structure as claimed in claim 1, wherein the slot is a closed slot with a straight-line shape.

8. The antenna structure as claimed in claim 1, wherein the coupling metal plate comprises a first portion and a second portion, and the slot is positioned between the first portion and the second portion of the coupling metal plate.

9. The antenna structure as claimed in claim 8, wherein the first radiation element and the second radiation element are covered by the first portion of the coupling metal plate.

10. The antenna structure as claimed in claim 8, wherein a coupling gap is formed between the first radiation element or the second radiation element and the first portion of the coupling metal plate, and a width of the coupling gap is from 1 mm to 3 mm.

11. The antenna structure as claimed in claim 8, wherein the ground element is covered by the second portion of the coupling metal plate.

12. The antenna structure as claimed in claim 1, wherein the first frequency band is from 2400 MHz to 2500 MHz, the second frequency band is from 5150 MHz to 5850 MHz, and the third frequency band is from 5925 MHz to 7125 MHz.

13. The antenna structure as claimed in claim 12, wherein the second radiation element is excited to generate the second frequency band.

14. The antenna structure as claimed in claim 12, wherein the metal cavity is excited to generate the third frequency band.

15. The antenna structure as claimed in claim 12, wherein a length of the first radiation element is from 0.25 to 0.5 wavelength of the first frequency band.

16. The antenna structure as claimed in claim 12, wherein a length of the second radiation element is from 0.5 to 1 wavelength of the second frequency band.

17. The antenna structure as claimed in claim 12, wherein a length of the second radiation element is from 0.25 to 0.5 wavelength of the second frequency band.

18. The antenna structure as claimed in claim 1, wherein a combination of the first radiation element, the second radiation element, and the ground element substantially has a T-shape.

19. The antenna structure as claimed in claim 1, wherein the slot is a closed slot with an L-shape.

* * * * *